Figure 6:
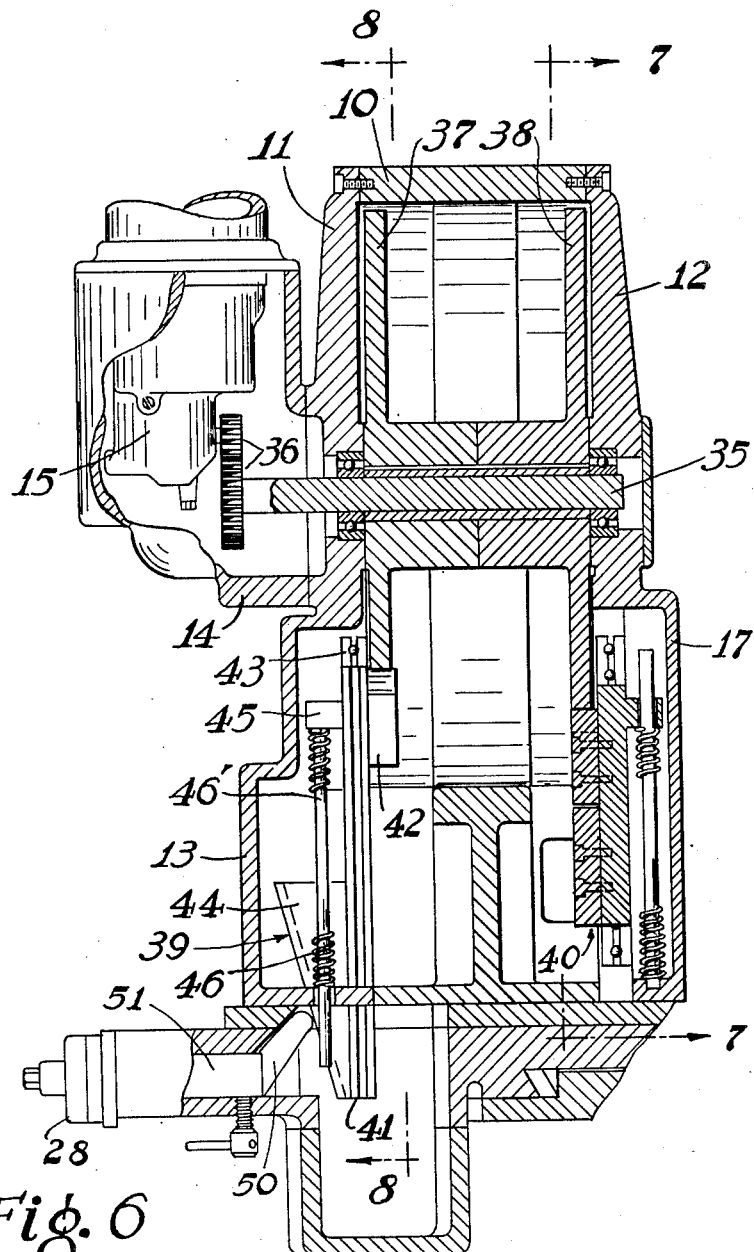

Nov. 10, 1953
N. HOGLUND
2,658,496
WHEEL DRESSING APPARATUS
Filed Jan. 20, 1950
5 Sheets-Sheet 1
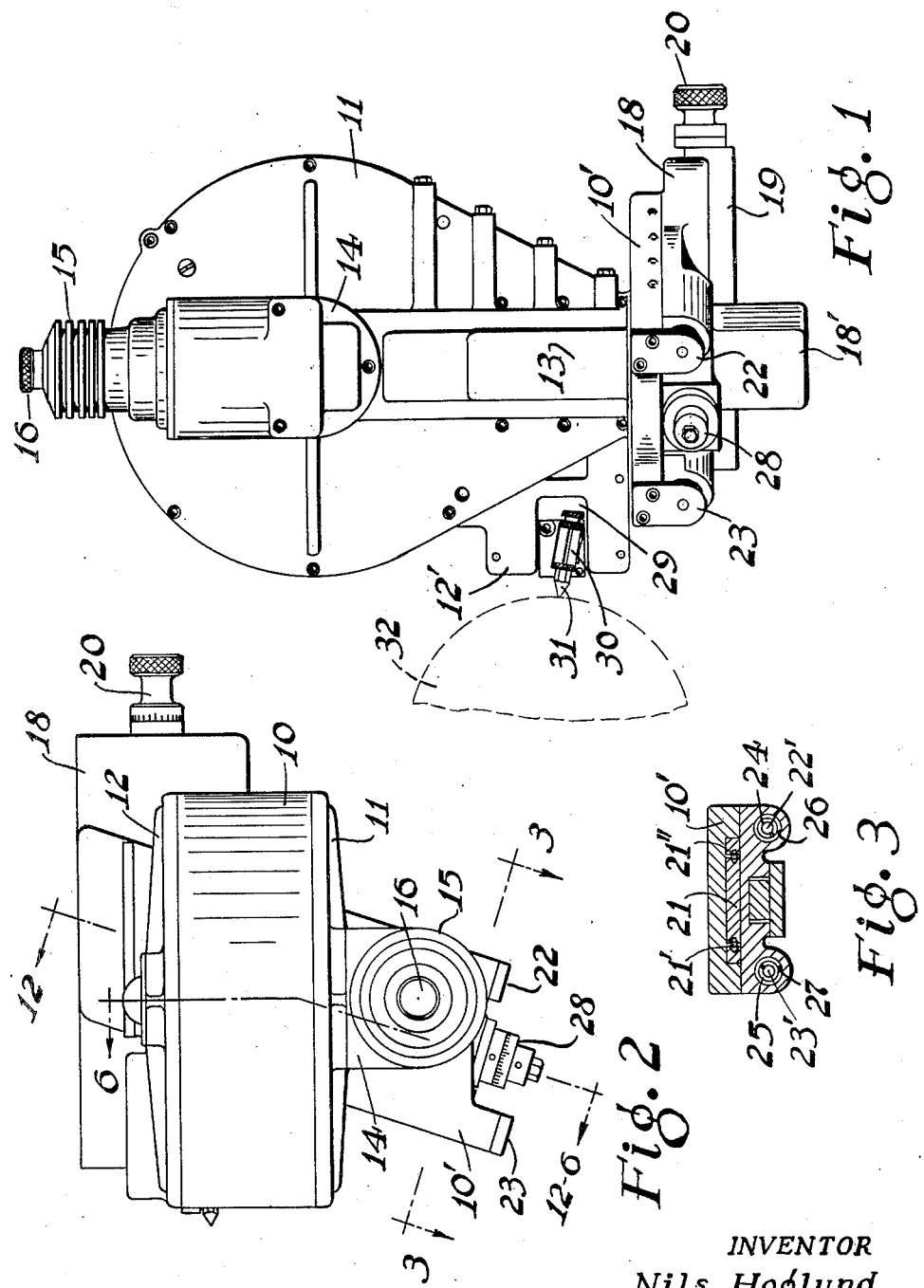
INVENTOR
Nils Hoglund
BY William A. Zalesak
ATTORNEY

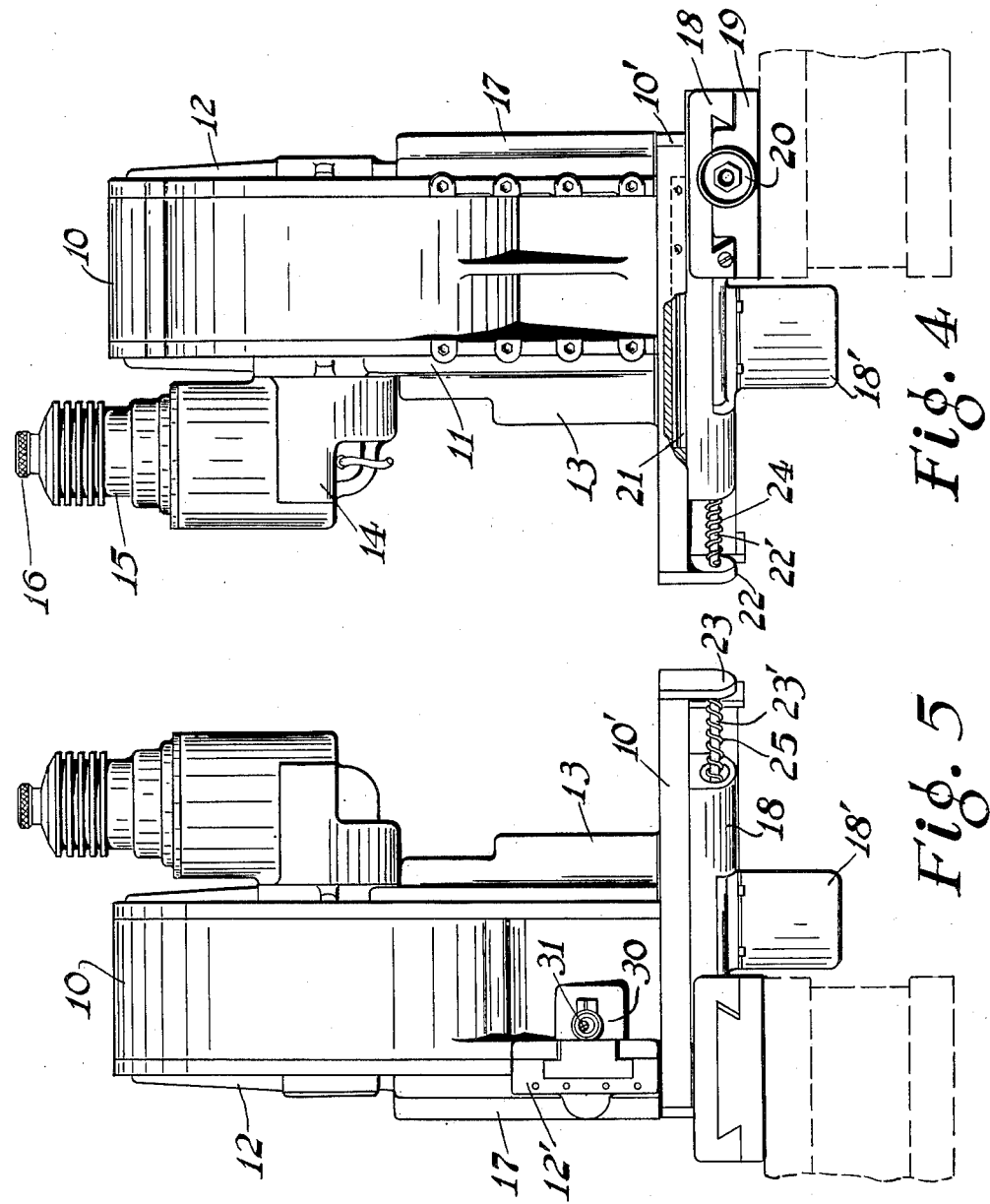

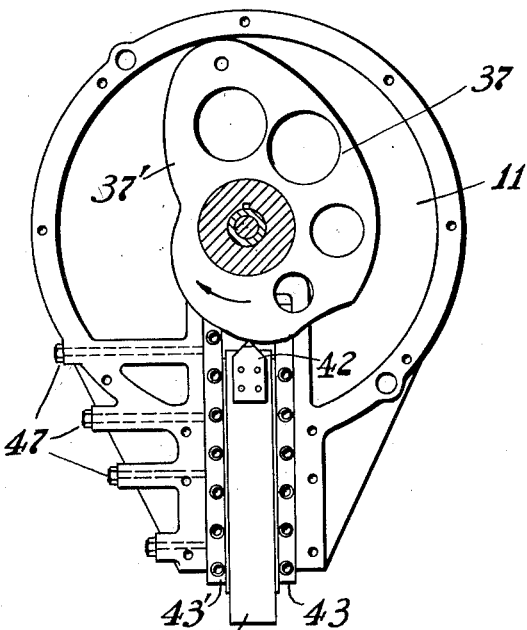
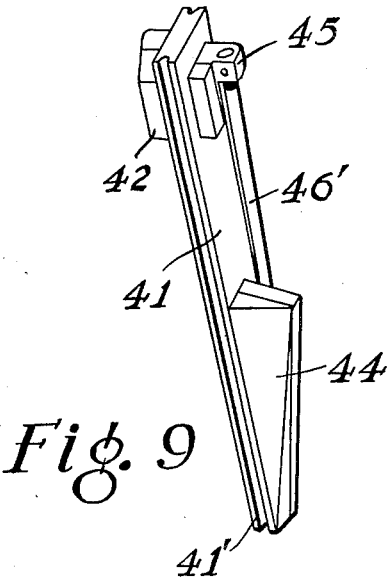
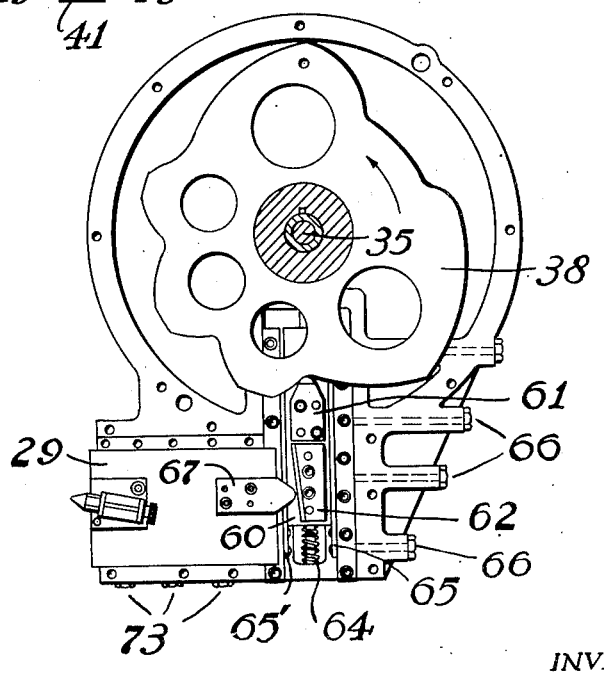

Patented Nov. 10, 1953

2,658,496

UNITED STATES PATENT OFFICE 2,658,496

WHEEL DRESSING APPARATUS

Nils Hoglund, Union, N. J.

Application January 20, 1950, Serial No. 139,638

15 Claims. (Cl. 125—11)

My invention relates to wheel dressing apparatus, more particularly to apparatus for automatically dressing, turning and forming precise contours on grinding wheels.

Prior apparatus for forming contours have employed different methods, one such being the conventional crushing method where a preshaped crusher roller is used for forming the wheel. Another employs a diamond dressing device which uses a template usually having a one-to-one ratio which is contacted by a follower to guide the diamond across the wheel being dressed. A modification of the last is a dressing device operating from a template with a one-to-one radial ratio and a two-to-one axial ratio, so designed that a follower and the template are travelling at a two-to-one ratio in the same direction, causing the diamond to produce the one-to-one ratio contour on the wheel in both coordinates. Other devices of this kind have also utilized a pantograph arrangement which supports the cutting diamond. Dressing devices of previous apparatus have usually employed as the prime movers complicated hydraulic mechanisms which are comparatively costly.

In addition thereto the diamond tool is not moved at a uniform speed along the contour of the wheel being dressed. As a result the diamond passes over some surfaces rapidly and over others slowly. The result of this difference of travel causes rough and smooth portions of the surface being dressed. Speeds along the contour vary as much as 300% in some cases. Further, due to the small ratio employed in some of the contour cams and followers associated therewith, error is introduced in the contour being formed unless the cam is extremely accurate. This requires careful, arduous and long preparation in manufacturing the cam.

Previous devices of this kind have also been complicated, requiring much space. In many cases the devices are not automatically controlled for successively passing the cutting diamond across the face of the wheel being dressed. Manual control of this operation induces further error.

It is, therefore, an object of my invention to provide an improved and simplified form of dressing apparatus.

A further object of my invention is to provide such an improved apparatus which assures accurate contours by eliminating the need for pantograph operation which introduces cumulative error during operation.

A further object of my invention is to eliminate hydraulic operation and to utilize electrical driving means of simple form.

A still further object of my invention is to provide an apparatus in which the travel of the cutting diamond is of uniform speed along the contour, thus insuring smooth, even surfaces at all points of the contour.

A further object of my invention is to provide an apparatus utilizing cams enlarged many times over the contour being dressed and of the order of, for example, ten times for controlling movement of the cutting tool whereby error is eliminated and accuracy assured.

A still further object of my invention is to provide cams having a sufficiently large ratio so that the contour on the cams can be easily retouched to correct any inaccuracies shown on the finished contour.

A further object of my invention is to provide such an apparatus which is compact and which is automatic and which eliminates the skill required for dressing when manual operation or semi-manual operation is employed.

These and other further objects will appear hereinafter.

Briefly, in accordance with my invention, I provide a slide mechanism which moves axially of the wheel being dressed. Supported on this slide mechanism is a housing in which is movably mounted another slide supporting the cutting tool for radial movement. The movement of the slide and housing in an axial direction, and movement of the cutting tool radially of the work being dressed is controlled by a combination of cams within the housing and mounted on a motor-driven shaft. Cooperating cam followers are associated with the housing slide and the slide on which the tool is mounted. As the shaft is rotated, axial movement of the slide and housing is produced, and radial movement of the diamond slide. Relative movement of the slides is controlled in predetermined manner to reproduce the contour of one of the cams which controls the radial feed of the diamond toward and from the surface of the wheel being dressed. The whole assembly is formed of very simple castings which can be easily and readily assembled or disassembled for repair purposes. The device is extremely compact and automatically moves the housing and cutting tool back and forth across the surface of the wheel being dressed.

Figure 10:
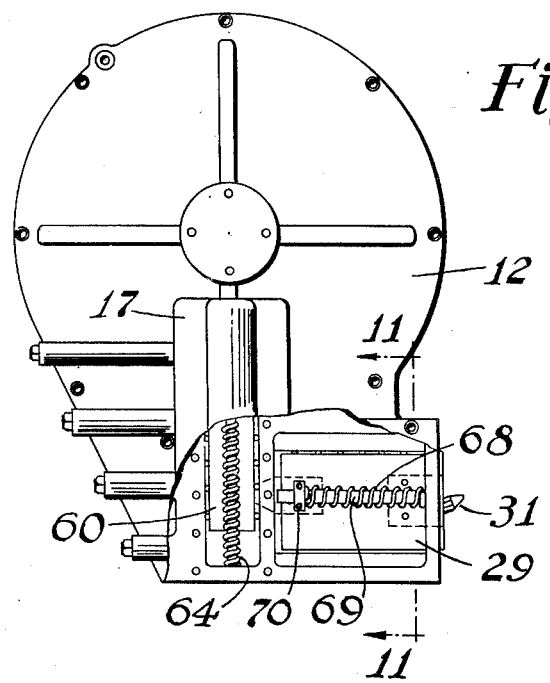
Figure 11:
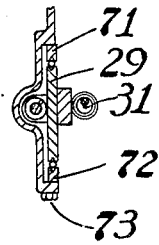
Figure 12:
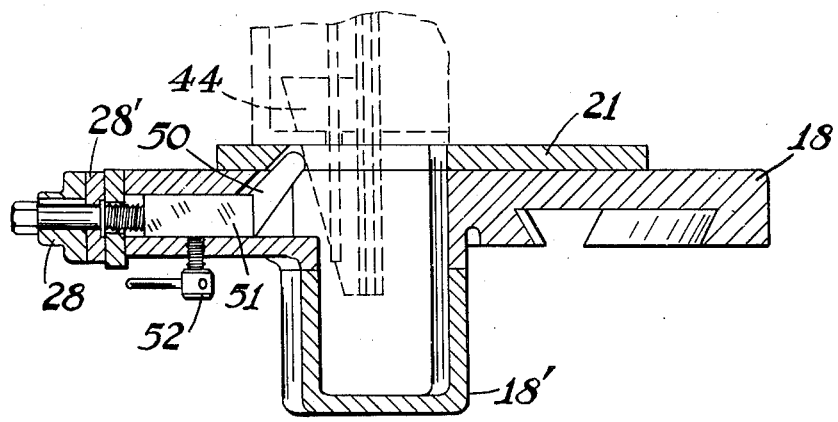

The novel features which I believe to be characteristic of my invention are set forth with particularity in the appended claims, but the invention itself will best be understood by reference to the following description taken in connection with the accompanying drawing in which Figure 1 is a front elevation of a dressing apparatus made according to my invention, Figure 2 is a plan view of Figure 1, Figure 3 is a section taken along the line 3—3 of Figure 2, Figure 4 is a right end elevation of Figure 1, Figure 5 is a left end elevation of Figure 1, Figure 6 is a section taken along the line 6—6 of Figure 2 showing details of construction, Figure 7 is a section taken along the line 7—7 of Figure 6 and showing the cam and cam follower and slide for causing radial movement of the cutting diamond, Figure 8 is a section taken along the line 8—8 of Figure 6 showing the cam and cam follower for causing axial movement of the housing and elements therein including the dressing diamond, Figure 9 is a detailed perspective of the slide and cam shown in Figure 8, Figure 10 is a back elevation of Figure 1 with parts broken away to show details of construction of the diamond slide, Figure 11 is a section taken along the line 11—11 of Figure 10, and Figure 12 is a section taken along the line 12—12 of Figure 2 showing the relationship between the slide housing and the cam for causing axial movement.

Main frame and housing

Referring to the drawings of Figures 1, 2, 4 and 5, a dresser apparatus made according to my invention includes a main frame or housing 10 having a base and cross slide 10' serving as a slide for supporting the housing which carries the operating mechanism for causing axial movement of the slide and housing along the surface to be dressed, as well as causing radial movement of the cutting diamond in a manner to be described. The axial feed slide frame or cover 11 and radial feed slide frame or cover 12 form with the main frame a complete housing for the operating mechanism to be described. The axial feed slide frame 11 is provided with housing portion 13 which houses the axial feed slide and cam follower to be described. Motor bracket 14 supports the electric driving motor 15 and the driving gear mechanism to be described. The control 16 for the motor is mounted at the top of the motor 15. This can be adjusted to control the speed of the motor and hence the operation of the device with respect to the surface being dressed.

As best shown in Figure 5, the radial feed slide frame 12 is provided with housing portion 17 for housing the vertically movable slide and cam follower for causing axial movement of the slide 10' and housing 10 in a manner to be described.

The elements so far described are mounted for axial movement on the in-feed slide 18 having a housing portion 18' for purposes to be described. A slide guide 19 supports the in-feed slide 18. The in-feed slide 18 can be caused to move in a radial direction with respect to the wheel being dressed by means of the feed screw 20 which is of more or less conventional design.

As best shown in the section in Figure 3 the cross slide and base 10' are mounted for movement on the cross slide guide 21 and are mounted for axial movement thereon by means of the ball bearing assemblies 21' and 21" so that the base 10', serving as a cross slide, may move freely along the axis of the wheel being dressed. Brackets 22 and 23 are mounted on the cross slide base 10' and are provided with spring retainer guides 22' and 23' on which the springs 24 and 25 are mounted for urging the slide outwardly from the plane of the paper shown in Figure 1. These springs are received within cavities 26 and 27 formed in the infeed slide 18. A screw having a graduated dial 28 for adjusting the position of the cross slide is rotatably mounted in the collar 28' fixed to the slide and will be described in further detail below.

The diamond holder slide 29 is mounted in an extension 12' on the radial feed slide frame 12. The diamond holder slide 29 supports a diamond holder 30 which in turn supports the cutting diamond 31 for forming the surface of the grinding wheel 32 shown by dotted lines.

In operation the mechanism to be described causes the cross feed slide 10' supporting the housing, comprising the frames 10, 11 and 12, to move axially but at a slight angle to the surface of the wheel being dressed. It is appreciated that this movement need not be at an angle, but can be axial depending upon requirements. As the slide moves back and forth axially of the wheel being dressed, the diamond and diamond holder are caused to move radially in and out with respect to the surface 32 being dressed. As the several passes are made the screw 20 may be operated to move the in-feed slide 18 toward the wheel being dressed in small increments until the contour is completed.

Cam shaft and drive

As pointed out above, there is mounted within the housing comprising frame members 10, 11 and 12, a horizontally mounted shaft driven by the motor 15 through a gear train to be described. Mounted upon this shaft are a pair of rotatable cam members having predetermined contours and cooperating with the cam members are cam followers. One of these followers operates a slide having a cam surface cooperating with the cross feed slide 10' to cause axial movement of the entire housing. Cooperating with the other cam is a second cam follower and slide mechanism which operates the diamond slide 24, causing radial movement of the diamond as the cams are rotated by the motor.

Referring now to Figure 6, which is a cross section taken along line 6—6 of Figure 2, the housing comprising members 10, 11 and 12 supports cam shaft 35 which is driven through the gear train 36 by motor 15 supported on the motor bracket and housing 14. Mounted on the shaft at one end thereof is the axial feed slide cam or cross slide cam 37 which operates a cam follower and ratio cam for controlling axial movement of the housing. The contour cam for controlling the movement of the diamond for cutting the contour on the wheel being dressed is the contour cam 38. A cam follower and ratio cam assembly is generally shown at 39. This cam follower and assembly is caused to have reciprocating vertical movement as the cam rotates. At the other side of the housing within the housing portion 17 is the cam follower and ratio cam which have reciprocating vertical movement and which cooperate with the diamond slide in the manner to be described, to cause radial movement of the diamond. Thus as the cam shaft and cams are rotated, the cam followers described move vertically, being biased upwardly by spring members to be described, so that the cam followers are always in contact with the rotating cams.

Axial feed

In order to better understand the operation of the mechanism for causing axial movement of the housing with the cams, motor and cutting diamond, reference may be had to Figures 6, 7, 8 and 12.

As shown in Figure 8, the cam 37 has biased toward it the axial feed slide 41 supporting the follower 42. This slide 41 is supported in the housing portion 13 of the frame 11 by means of the ball bearing assemblies 43 and 43', held in place by loading screws 47, the slide 41 being biased toward the cam by means of the biasing spring 46 mounted on the spring guide 46', the spring being mounted between the bottom of the frame member and the spring retainer 45 mounted on the axial feed slide 41.

As best shown in Figure 9, the slide 41 is provided with grooves, such as 41', into which the ball bearings 43, 43' fit. The ratio cam 44 mounted on the slide has an elongated triangular shape. As best shown in Figures 6 and 12, there is mounted on the end of the adjusting screw 28 a slide 51 having a rectangular cross section and supporting a cam follower finger 50 which contacts the inclined surface of the ratio cam 44. The adjusted position of this adjusting screw 28 and its associated elements is locked by means of the locking screw 52. Thus, as the slide 41 moves up and down within housing portion 13' the surface rides against the finger 50, causing the housing to move to the right (see Figures 6 and 12) or backward as the cam descends, against the action of the compression spring members 24 and 25. As the ratio cam moves vertically upward the springs 24 and 25 return the housing toward the left or forward.

It is obvious, by adjusting screw 28 the position of the finger 50 can be moved to the right or left, hence determining the initial position of the housing for axial movement. It will be understood, of course, the housing slides on the slide guide 21 as described above.

The cam 37 is so designed that the axial feed along the contour during the dressing or cutting pass is slow and matched to the radial feed of the dressing diamond. The return is rapid as determined by the substantially flat part 37'' of the cam. It is obvious that the contour of the cam is much greater than the distance of axial travel of the housing. The cam portion 44 of slide 41 determines the ratio of movement of the housing with respect to the vertical movement of the slide and can of course be readily varied by utilizing replaceable slides with different cam surfaces.

Radial feed

The radial feed of the dressing diamond is controlled by the cam 38 and reference is had to Figures 6, 7, 10 and 11 to describe the construction and operation of this portion of my invention.

The radial feed slide cam assembly 60 is provided at its upper portion with removal cam follower 61 which cooperates with the periphery of the cam 38 and also carries the reduction ratio cam 62. The spring 64 biases the slide cam assembly 60 and cam follower 61 upwardly against the cam. The slide is mounted in the ball bearing supports 65 and 65', the preloading screws 66 extending through and contacting the ball bearing assembly 65 to preload the supports.

Mounted on the slide 29, which supports the diamond and diamond holder, is a cam follower 67 which rides along the surface of the reduction ratio cam 62. As best shown in Figures 10 and 11, a spring 68 mounted on the spring guide 69 biases the slide inwardly of the housing, the stop 70 on the slide 29 being provided with an aperture through which the spring guide 69 extends. Ball bearing assemblies 71 and 72 slidably support the slide member 29, preloading screws 73 contacting the ball bearing supports.

As the cam 38 is rotated as shown, the slide 60 is caused to move vertically up and down, the cam follower 67 riding on the surface of the reduction ratio cam 62 and causing the slide 29 and diamond and diamond holder to move radially inwardly and outwardly in accordance with the periphery of the cam 38.

Thus, as the motor drives the cam shaft, both cams 37 and 38 are rotated simultaneously to cause movement of the housing axially of the wheel being dressed and the dressing diamond radially in a predetermined pattern.

The development of the cam 38 in cooperation with the development of cam 37 results in the development of the linear surface of the grinding wheel to be dressed. Ratio cam 62 determines the degree of reduction of the movement of the diamond dresser relative to the radial movement of the cam follower 61 with respect to the cam 38.

The contours of the cams are so related that the diamond dresser at all times travels at a constant linear speed. That is, where a deep radial cut by the diamond is made, the axial movement of the housing is slowed down relative to the radial movement of the diamond dresser.

It is understood, of course, that the various ratio cams can be changed at will as well as the cams themselves in a very simple manner, since all parts are readily replaceable.

Inasmuch as the contours of the cams are so large relative to the end movement of the dressing diamond, the contours can be easily retouched to correct any inaccuracies shown on the finished contour by merely roughly filing and polishing the corresponding contour on the cams.

While I have indicated the preferred embodiments of my invention of which I am now aware and have also indicated only one specific application for which my invention may be employed, it will be apparent that my invention is by no means limited to the exact forms illustrated or the use indicated, but that many variations may be made in the particular structure used and the purpose for which it is employed without departing from the scope of my invention as set forth in the appended claims.

What I claim as new is:

1. Apparatus for forming a contour on a grinding surface including a dressing tool, a housing movably supporting said dressing tool for movement in one direction, a slide support for said housing upon which said housing is movably supported for movement in the direction transverse to said one direction, said housing enclosing a cam mechanism therein including a cam controlling movement of said housing and tool, and a second cam in said housing for controlling movement of said tool, and slides cooperating with said cams and with said housing and tool causing movement of said housing and tool in said transverse direction during operation of said apparatus, and movement of said tool in said one direction.

2. Apparatus for forming a contour on a grinding surface including a housing, a slide support for said housing slidably supporting said housing for movement axially of the grinding surface being dressed, a cam shaft supported within said housing and a pair of cams mounted on said shaft to be rotated thereby, a driving motor mounted on said housing connected to said shaft for rotating said cams, slides mounted within said housing and having cam followers cooperating with said cams, means biasing said slides and followers against the surface of said cams, one of said slides having means for causing movement of said housing along said slide support axially of said surface being dressed, and other means supported by said housing operatively connected with the slide cooperating with said second cam including a slide movable transversely of the slide support, said last slide including a dressing tool mounted on said slide.

3. Apparatus for forming a contour on a grinding surface including a housing, a slide support for said housing for supporting said housing for movement axially of the grinding surface being dressed, a cam shaft rotatably supported within said housing and a pair of cams mounted on said shaft to be rotated thereby, and a driving motor connected to said shaft for rotating said cams, slides mounted within said housing and having cam followers associated with said cams, and means biasing said followers against the contour surfaces of said cams, one of said slides having means causing movement of said housing axially of said surface being dressed, the other of said slides having a reducing cam supported therein, means slidably mounted on said housing including a slide movable transversely of the axial movement of said housing, said last slide having a cam follower operatively associated with said reducing cam, and a dressing tool mounted on said last slide.

4. Apparatus for forming a contour on a grinding surface including a housing, a slide guide for said housing supporting said housing for movement axially of the grinding surface being dressed, a support supporting said slide guide and housing, said slide guide and housing having registering apertures therein, a cam shaft supported within said housing and a cam mounted on said shaft to be rotated thereby, and a driving motor connected to said shaft for rotating said cam, a slide mounted within said housing and having a cam follower associated therewith, and means biasing said follower against the surface of said cam, said slide having a cam extending and movable through said apertures, an adjustable element supported on the support for said slide guide and housing adjacent said apertures and contacting said cam movable therethrough whereby when said cam moves into and out of said apertures said housing is given an axial movement along said slide guide, and a dressing tool movably supported on said housing.

5. Apparatus for forming a contour on a grinding surface including a housing carrying a dressing tool, a rotatable shaft supported within said housing, a slide supporting said housing, a base supporting said slide and housing, a cam mounted on said shaft, a slide and cam follower within said housing and operatively connected with said cam, and means biasing said cam follower against said cam, a ratio cam mounted on said last slide and operatively connected with said base whereby when said last slide is caused to move in one direction said housing will be caused to move along a predetermined path on said base and normal to said one direction.

6. Apparatus for forming a contour on a grinding surface including a housing, a slide supporting said housing, a base supporting said slide and housing a shaft within said housing, and means connected to said shaft driving said shaft, a contour cam mounted on said shaft, a first slide mounted for vertical movement and having a cam follower engaging the periphery of said cam, a ratio cam mounted on said slide, a second slide mounted on said housing and supporting a dressing tool and movable normally to said first slide, and a cam follower contacting said ratio cam and means biasing said last cam follower against said ratio cam whereby rotation of said contour cam causes movement of said dressing tool normally of said housing, and means within said housing and contacting said base for causing movement of said housing along said slide during operation of said apparatus.

7. Apparatus for forming a contour on a grinding surface including a housing carrying a dressing tool, a rotatable shaft supported within said housing, a slide supporting said housing, a base supporting said slide and housing, a cam mounted on said shaft, a slide and cam follower operatively connected with said cam, and means biasing said cam follower against said cam, a ratio cam mounted on said last slide and cooperating with said base whereby when said last slide is caused to move in a vertical direction said housing will be caused to move along a horizontal path along said base, and resilient means positioned between said base and one end of said slide biasing said slide to one position.

8. Apparatus for forming a contour on a grinding surface including a base, a housing mounted on said base for slidable movement relative thereto, said housing including a main frame and a pair of spaced oppositely disposed side frames, a shaft extending transversely of said housing and rotatably supported in said side frames, cams mounted on said shaft within said housing, slides mounted on said side frames and contacting said cams, a slide on one of said frames supporting a dressing tool and having means contacting one of said first-mentioned slides, another of said first-mentioned slides operably connected with said base whereby when said cam shaft is rotated said housing is moved along said base and said tool is moved relative to said housing.

9. Apparatus for forming a contour on a grinding surface including a base, a housing mounted on said base for slidable movement relative thereto, said housing including a main frame and a pair of spaced oppositely disposed side frames, a shaft extending transversely of said housing and rotatably supported in said side frames, a cam mounted on said shaft within said housing, a slide mounted on one of said side frames and contacting said cam, said slide extending through said housing and having an inclined surface engaging said base, and a dressing tool movably mounted within said housing, said housing being moved along said base when said cam shaft is rotated.

10. Apparatus for forming a contour on a grinding surface including a base, a housing mounted on said base for slidable movement relative thereto, said housing including a main frame and a pair of spaced oppositely disposed side frames, a shaft extending transversely of said housing and rotatably supported in said side frames, a cam mounted on said shaft within said housing, a slide mounted on one of said slide frames and contacting said cam, a second slide mounted on said side frame, a dressing tool mounted on said second slide, said first slide having an element thereon provided with an inclined surface and means on said second slide engaging said inclined surface, said second slide being caused to move relative to said housing toward and from the grinding surface when said cam shaft is rotated.

11. Apparatus for forming a contour on a grinding surface including a dressing tool, a housing supporting said dressing tool, a base, a slide supporting said housing on said base, said housing having means slidably supporting said tool and movable along said slide, means within said housing for controlling movement of said housing along said slide and movement of said slidable means supporting said tool, said means controlling movement of said housing and means slidably supporting said tool including a shaft having a plurality of cams mounted thereon, slides mounted on the inner walls of said housing and contacting said cams, one of said slides contacting the slidable means supporting said tool, the other of said slides having a portion extending outside of said housing and contacting said base for causing movement of said housing and said tool along the slide supporting said housing.

12. Apparatus for forming a contour on a grinding wheel surface including a housing, a slide support for said housing supporting said housing for movement axially of the grinding surface being dressed, a cam shaft rotatably supported within said housing, a pair of cams mounted on said shaft to be rotated thereby, a driving motor connected to said shaft for rotating said cams, slides within said housing and having cam followers contacting said cams, one of said slides having means for causing movement of said housing axially of said surface being dressed during operation of said apparatus, the other of said slides having an inclined surface providing a reducing cam, means slidably mounted on said housing including a slide movable transversely of the axial movement of said housing, said last slide having a cam follower contacting said reducing cam, and a dressing tool mounted on said last slide.

13. Apparatus for forming a contour on a grinding wheel surface including a housing, a base, a slide support on said base for said housing slidably supporting said housing for movement axially of the grinding wheel being dressed, a shaft within said housing and means connected to said shaft for driving said shaft, a contour cam mounted on said shaft, a first slide mounted for movement in one direction and having a follower engaging the periphery of said cam, a ratio cam mounted on said first slide including an inclined surface, a second slide mounted on said housing and supporting a dressing tool and movable normal to said first slide, and a cam follower on said second slide contacting said ratio cam whereby rotation of said contour cam causes a movement of said dressing tool, and a second contour cam mounted on said shaft, a slide having a cam follower operatively connected with said second cam, a ratio cam mounted on said last slide and including an inclined surface contacting said base whereby when said last slide is caused to move in said one direction, said housing will be caused to move along said base.

14. Apparatus for forming a contour on a grinding wheel surface including a housing, a base, a slide support for said housing supporting said housing for movement on said base axially of the grinding wheel being dressed, a cam shaft rotatably supported within said housing, a pair of cams mounted on said shaft to be rotated thereby, a driving motor connected to said shaft for rotating said cams, a pair of slides within said housing and having cam followers contacting said cams, each of said pair of slides supporting a reducing cam having an inclined surface, the inclined surface of one of said pair of slides contacting said base to control movement of said housing, means slidably mounted on said housing including a slide movable transversely of the axial movement of said housing, said last slide having a cam follower contacting the inclined surface of the other of said pair of slides, and a dressing tool mounted on said last slide.

15. Apparatus for forming a contour on a grinding wheel surface including a housing, a base, a slide support for said housing supporting said housing for movement on said base axially of the grinding wheel being dressed, a cam shaft rotatably supported within said housing, a pair of contour cams mounted in said shaft to be rotated thereby, said cams being within said housing adjacent the inner walls thereof, a driving motor connected to said shaft for rotating said cams, a pair of slides mounted within and on the walls of said housing and having cam followers contacting said cams, each of said pair of slides supporting a reducing cam having an inclined surface, the inclined surface of one of said pair of slides contacting said base to control movement of said housing, means slidably mounted on said housing including a slide movable transversely of the axial movement of said housing, said last slide having a cam follower contacting the inclined surface of the other of said pair of slides, and a dressing tool mounted on said last slide.

NILS HOGLUND.

References Cited in the file of this patent

UNITED STATES PATENTS

| Number | Name | Date |
| --- | --- | --- |
| 278,629 | Taylor | May 29, 1883 |
| 1,122,440 | Thomas | Dec. 29, 1914 |
| 1,571,323 | Cole | Feb. 2, 1926 |
| 1,771,907 | Abramson | July 29, 1930 |
| 2,317,411 | Seyferth | Apr. 27, 1943 |
| 2,340,192 | Locke | Jan. 25, 1944 |
| 2,393,727 | Aber | June 29, 1946 |

FOREIGN PATENTS

| Number | Country | Date |
| --- | --- | --- |
| 217,571 | Switzerland | Feb. 16, 1942 |
| 398,841 | Great Britain | Sept. 19, 1933 |
| 422,123 | Great Britain | Dec. 31, 1934 |
| 565,684 | Great Britain | Nov. 22, 1944 |
| 611,246 | France | July 3, 1926 |